(12) United States Patent  
Ahlert et al.

(10) Patent No.: US 7,890,855 B2  
(45) Date of Patent: Feb. 15, 2011

(54) METHOD AND COMPUTER SYSTEM FOR SEPARATING AND PROCESSING LAYOUT INFORMATION AND DATA OF A DOCUMENT

(75) Inventors: Dirk Ahlert, Mühlhausen (DE); Wolfgang Koch, Dielheim (DE); Gunther Liebich, Walldorf (DE)

(73) Assignee: SAP AG, Walldorf (DE)

( * ) Notice: Subject to any disclaimer, the term of this patent is extended or adjusted under 35 U.S.C. 154(b) by 427 days.

(21) Appl. No.: 10/484,881

(22) PCT Filed: Apr. 16, 2002

(86) PCT No.: PCT/EP02/04208

§ 371 (c)(1), (2), (4) Date: Oct. 4, 2004

(87) PCT Pub. No.: WO03/012633

PCT Pub. Date: Feb. 13, 2003

(65) Prior Publication Data

US 2005/0034066 A1    Feb. 10, 2005

(30) Foreign Application Priority Data

Jul. 27, 2001    (EP) .................................. 01118305

(51) Int. Cl.  
*G06F 17/00* (2006.01)  
*G06F 17/30* (2006.01)

(52) U.S. Cl. ................ 715/236; 715/234; 715/248; 715/272

(58) Field of Classification Search .............. 715/513, 715/522, 523, 234–236, 243, 239, 242, 249, 715/272, 248; 707/100, 104.1  
See application file for complete search history.

(56) References Cited

U.S. PATENT DOCUMENTS 5,860,073 A    1/1999    Ferrel et al.  
5,944,781 A    8/1999    Murray (Continued)

FOREIGN PATENT DOCUMENTS

EP    0 812 088 A2    12/1997

(Continued)

OTHER PUBLICATIONS

"XSL Transformations (XSLT)," W3C Recommendation, Nov. 16, 1999, retrieved from the internet: http://www.w3.org/TR/xslt, Sections 1-2.7 (11 pages).

(Continued)

*Primary Examiner* — Adam L Basehoar  
(74) *Attorney, Agent, or Firm* — Finnegan, Henderson, Farabow, Garrett & Dunner, L.L.P.

(57) ABSTRACT

Computer-implemented methods, computer systems and computer program products are provided for separating and processing layout information and data of a document. The computer system provides a predefined document description. The document description is decomposed into a layout template and a data description. In a preferred embodiment of the invention, decomposition is achieved by using style sheet language transformations. Optionally, the computer system may instantiate a data instance from the data description and merge the data instance with the layout template into an individual document description. The individual document description can be rendered by a conventional browser.

12 Claims, 4 Drawing Sheets

U.S. PATENT DOCUMENTS

| | | | |
|---|---|---|---|
| 5,995,985 A * | 11/1999 | Cai | 715/201 |
| 6,023,714 A * | 2/2000 | Hill et al. | 715/235 |
| 6,083,276 A * | 7/2000 | Davidson et al. | 717/107 |
| 6,192,380 B1 | 2/2001 | Light et al. | |
| 6,212,534 B1 * | 4/2001 | Lo et al. | 715/205 |
| 6,226,632 B1 * | 5/2001 | Takahashi et al. | 707/3 |
| 6,279,015 B1 | 8/2001 | Fong et al. | |
| 6,429,882 B1 | 8/2002 | Abdelnur et al. | |
| 6,516,349 B1 | 2/2003 | Lieberman | |
| 6,582,474 B2 * | 6/2003 | LaMarca et al. | 715/234 |
| 6,589,290 B1 | 7/2003 | Maxwell et al. | |
| 6,603,489 B1 | 8/2003 | Edlund et al. | |
| 6,651,217 B1 | 11/2003 | Kennedy et al. | |
| 6,701,308 B1 * | 3/2004 | Chen et al. | 707/3 |
| 6,701,486 B1 | 3/2004 | Weber et al. | |
| 6,801,224 B1 | 10/2004 | Lewallen | |
| 6,922,810 B1 | 7/2005 | Trower et al. | |
| 6,928,623 B1 | 8/2005 | Sibert | |
| 6,941,510 B1 * | 9/2005 | Ozzie et al. | 715/513 |
| 6,968,503 B1 | 11/2005 | Chang et al. | |
| 6,981,028 B1 | 12/2005 | Rawat et al. | |
| 7,016,977 B1 * | 3/2006 | Dunsmoir et al. | 709/246 |
| 7,039,863 B1 * | 5/2006 | Caro et al. | 715/209 |
| 7,058,886 B1 | 6/2006 | Sulistio et al. | |
| 7,117,429 B2 * | 10/2006 | Vedullapalli et al. | 715/235 |
| 7,143,359 B2 | 11/2006 | Aggarwal et al. | |
| 7,194,680 B1 * | 3/2007 | Roy et al. | 715/205 |
| 7,222,087 B1 | 5/2007 | Bezos et al. | |
| 7,234,105 B2 | 6/2007 | Bezrukov et al. | |
| 7,324,983 B1 | 1/2008 | Morris et al. | |
| 7,392,468 B2 * | 6/2008 | Igata et al. | 715/203 |
| 2001/0014900 A1 * | 8/2001 | Brauer et al. | 707/513 |
| 2001/0056460 A1 | 12/2001 | Sahota et al. | |
| 2002/0054081 A1 | 5/2002 | Mimoun | |
| 2002/0077846 A1 * | 6/2002 | Bierbrauer et al. | 705/1 |
| 2002/0093530 A1 | 7/2002 | Krothapalli et al. | |
| 2002/0111963 A1 * | 8/2002 | Gebert et al. | 707/513 |
| 2003/0014442 A1 * | 1/2003 | Shiigi et al. | 707/513 |
| 2004/0003341 A1 | 1/2004 | alSafadi et al. | |
| 2004/0039988 A1 | 2/2004 | Lee et al. | |
| 2004/0083453 A1 | 4/2004 | Knight et al. | |
| 2004/0205530 A1 | 10/2004 | Borg | |
| 2004/0249486 A1 | 12/2004 | Ahlert et al. | |
| 2004/0249487 A1 | 12/2004 | Ahlert et al. | |
| 2005/0120043 A1 | 6/2005 | Lee et al. | |
| 2006/0224397 A1 | 10/2006 | Morris et al. | |
| 2007/0186150 A1 | 8/2007 | Rao et al. | |

FOREIGN PATENT DOCUMENTS

| | | |
|---|---|---|
| EP | 1100013 | 5/2001 |
| JP | 2001-143006 | 11/1999 |
| JP | 2002-526862 | 8/2002 |
| WO | WO 9917193 | 4/1999 |
| WO | WO 9963473 | 12/1999 |
| WO | WO 00/20985 | 4/2000 |
| WO | WO 0033535 | 6/2000 |
| WO | WO 0034860 | 6/2000 |
| WO | WO 0052564 | 9/2000 |
| WO | WO 0052596 | 9/2000 |
| WO | WO 0072197 | 11/2000 |
| WO | WO 01/18630 | 3/2001 |
| WO | WO 01/29636 | 4/2001 |

OTHER PUBLICATIONS

"XSL Transformations (XSLT)," W3C Recommendation, Online, Nov. 16, 1999, XP002189938, retrieved from the Internet, URL:http://www.W3.org/TR/xslt, retrieved on Feb. 11, 2002, paragraphs '001 and '002, pp. 1-102.

Dubinko et al., "Xforms 1.0 W3C Working Draft 08," Jun. 2001, pp. 1-65.

Dubinko et al., Xforms 1.0, Feb. 2001, W3C, Draft 16, Feb. 2001, pp. 1-179.

Holman, Ken "What is XSLT," Aug. 16, 2000, XML.com, pp. 1-46.

Holzner et al., XML to XHTML Transformations with XSLT Processors, Jun. 22, 2001, pp. 1-4.

Khare, Can Xform Transform the Web?, Mar. 9, 2000, Seventh Heaven, pp. 1-12.

Pemberton et al., Xforms 1.0, Feb. 2001, W3C, Working Draft 1.0, pp. 1-83 and Appendix B, pp. 1-61.

Phanouriou, UIMLA:A Device-Independent User Interface markup Language, Sep. 26, 2000, pp. i-xi, pp. 1-161.

European Office Action dated Feb. 2, 2008, for Application No. EP 01118304, 3 pages.

Goeschka K. M. et al., "Client and Legacy Integration in Object-Oriented Web Engineering," IEEE Multimedia, vol. 8, No. 1, Mar. 2001, pp. 32-41.

Meyer T. et al., "WAXweb: a MOO-based collaborative hypermedia system for WWW," 1995, pp. 77-84.

Japanese Office Action dated Oct. 15, 2010 (3 pages) and translation thereof (4 pages) for Japanese Application No. 2008-101949.

* cited by examiner

METHOD AND COMPUTER SYSTEM FOR SEPARATING AND PROCESSING LAYOUT INFORMATION AND DATA OF A DOCUMENT

This application is a national stage filing under 35 U.S.C. §371 of International Application No. PCT/EP02/04208, filed Apr. 16, 2002, which published in the English language.

FIELD OF THE INVENTION

The present invention generally relates to document processing in a data processing system, and more particularly relates to a computer-implemented method and computer system to handle layout information and data.

BACKGROUND OF THE INVENTION

In prior art systems, documents, such as human interface descriptions, typically are described with a standardized document description language (SDL). The term "human interface" as used herein after, describes any kind of application interface for a human to interact with application programs that run on a computer. Examples for human interfaces are graphical user interfaces (GUI) or voice user interfaces (VUI).

Typically, the SDL is an "Extensible Markup Language" (XML) based language that provides a set of layout controls, wherein a layout control comprises description instructions that describe a specific layout element (LE). A transformer program, comprising transformation rules, transforms the layout element into a browser compliant description. In a SDL, typical layout elements are "row," "cell," "table," "grid," etc. Such layout elements can be reused in any context of any application.

A browser, as used herein after, is a computer program that "renders" a document which is written in a markup language, such as "Hyper Text Markup Language" (HTML), "Wireless Markup Language" (WML) or "Voice Extensible Markup Language" (VXML), into a visual or audio presentation of this document. A browser can be device specific. For example, a browser that renders a HTML document on a personal computer screen differs from a browser that renders a WML document on a wireless application protocol (WAP) cell phone display.

The browser compliant description can be rendered by a conventional browser into corresponding visual or audio layout elements on an output device of a computer.

In the XForms 1.0 specification (8 Jun. 2001) of the World Wide Web Consortium (W3C), the assumption is made that data information and layout information are separated from the beginning when a new document is created. This requires the exact knowledge of the data model that is used in an application using the new document. Data model, as used herein after, corresponds to a data description of data that are used (displayed, played, captured, etc.) by the document. However, there are applications where the data model of the application is not known when the document design starts. For example, when an application programmer builds a survey application, typically, the information that is to be captured through a survey form (questionnaire) is defined while developing the survey document. Input fields are added to the form as they are defined during the design process. In general, no data model exists that describes the corresponding data (e.g. dependencies between data, such as questions in a group of questions).

SUMMARY OF THE INVENTION

Hence, the present invention provides methods, computer systems and computer program products to solve the technical problem of automatically separating data information from layout information on the basis of a document where layout information and data information are mixed.

For convenience of explanation and without the intention of limiting embodiments of the present invention, in the following description of the present invention it is assumed that the document is a description of a graphical human interface of a computer. However, the term "layout element," as used hereinafter to describe a graphical layout element, also has a meaning in a voice human interface, where it corresponds to a sequence of sounds (e.g., spoken words) that follows a specific dialogue (interaction) schema.

The solution to the technical problem according to a preferred embodiment of the present invention is provided by the following characteristics: The inventive computer system a) provides a predefined document description, wherein, preferably, the document description is a markup language description, such as a XML or a XHTML document; and b) decomposes the document description into a layout template and a data description.

It is an advantage of the present invention that the computer system may automatically create a data model for an application that initially lacks a data model. This is the case when the application is defined through a document description that includes both data and layout information. Examples for this kind of applications are survey forms or forms for service requests. Survey forms may comprise input or answer fields that are defined during the survey design process and where no predefined data description exists. Service requests may comprise fields for services that are not predefined because they are not offered regularly. Therefore, a predefined data description may not exist.

Further, the present invention solves the technical problem to prompt a user with an individual document that includes runtime dependent data (e.g., data that are created or modified during runtime). Runtime, as used hereinafter, means: occurring while a document is executing (being used interactively by a user). Design-time means: occurring while a document is designed (before being used interactively). By way of non-limiting examples, runtime dependent data include user name, document creation date, session ID, error messages, etc.

A solution to the technical problem, according to a preferred embodiment of the present invention, is provided by the following characteristics: The inventive computer system c) instantiates a data instance from the data description; and d) merges the data instance with the layout template into an individual document description. The individual document description can be rendered by a browser.

An advantage is the ability of the data instance to comprise runtime dependent data that can be modified by an application program during runtime processing. Therefore, the individual document description may prompt the user with runtime dependent data that are dynamic when compared to then static data of the data description.

At any place in the description of the present invention where a style sheet language transformation, such as XSLT, is used to define transformation or conversion rules, alternatively, a person of skill in the art can implement these rules in any programming language, such as Java, as well.

The aspects of the invention will be realized and attained by means of the elements and combinations particularly pointed out in the appended claims. It is to be understood that both, the foregoing general description and the following detailed description are exemplary and explanatory only and are not restrictive of the invention as described.

DETAILED DESCRIPTION

Wherever possible, the same reference numbers will be used throughout the drawings to refer to the same or like parts. For convenience of explanation the reference number table at the end or the description lists the most important reference numbers and their descriptions.

Figure 1:
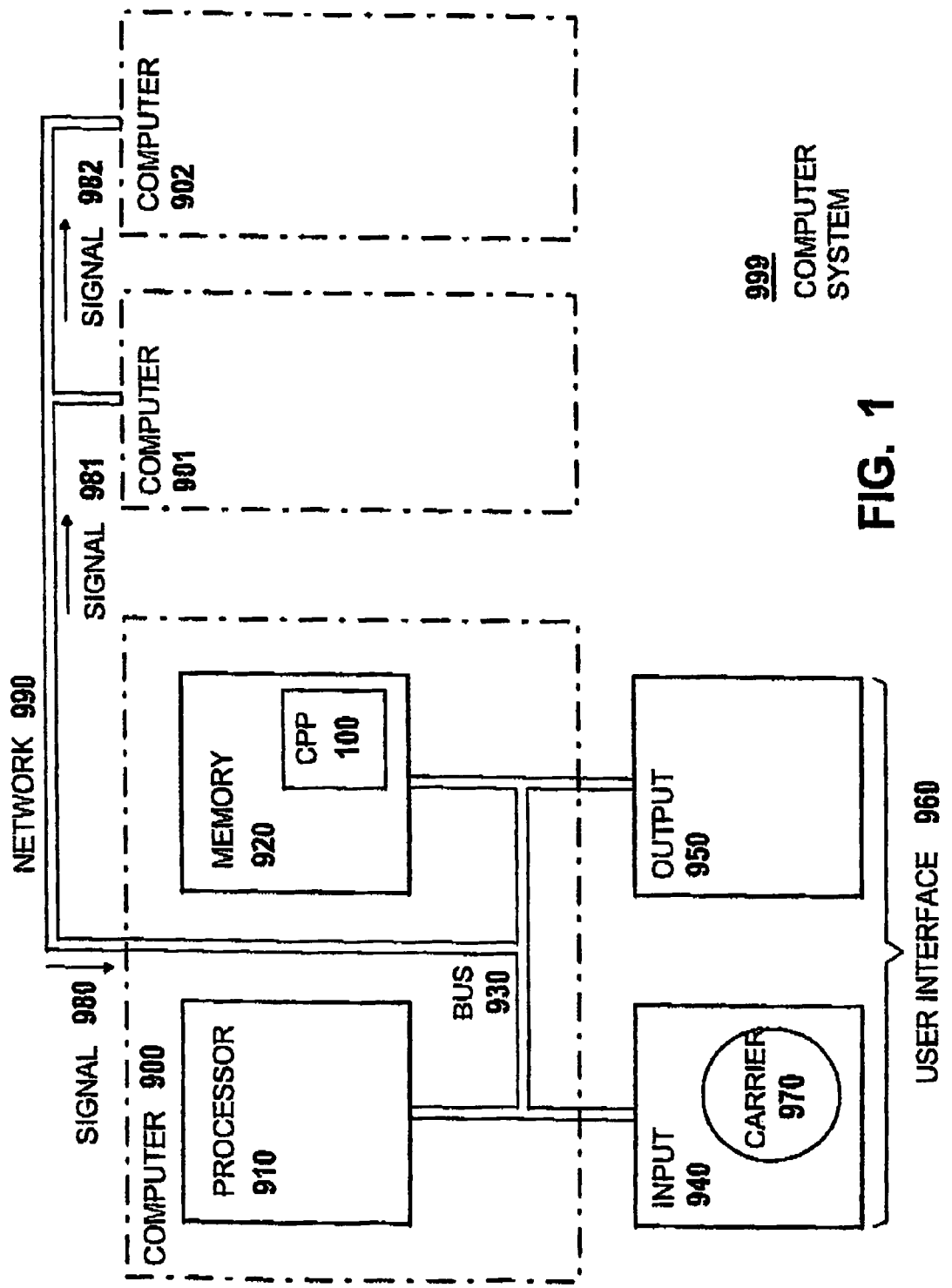
FIG. 1 illustrates a block diagram of an exemplary implementation of the inventive computer network system.

FIG. 1 illustrates a simplified block diagram of an exemplary implementation of the inventive computer network system 999 having a plurality of computers 900, 901, 902 (or 90$q$, with q=0 ... Q-1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program."

In respect to computer 900, computer 901/902 is sometimes referred to as "remote computer," computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

Computer Program Product (CPP) 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930," connections between computers 900-902 are referred to as "network 990." Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e., world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN), a Integrated Services Digital Network (ISDN), an infra-red (IR) link, a radio link, like Universal Mobile Telecommunications System (UMTS), Global System for Mobile Communication (GSM), Code Division. Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language (HTML), extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provided," are convenient abbreviations to express actions by a computer that is controlled by a program. Furthermore, the term "preferably" is nonexclusive and means "preferably, but not limited to."

It is not important for the present invention, where computer programs, files or documents are stored in computer system 999. For convenience of explanation, they are stored in memory 920 of computer 900.

Figure 2:
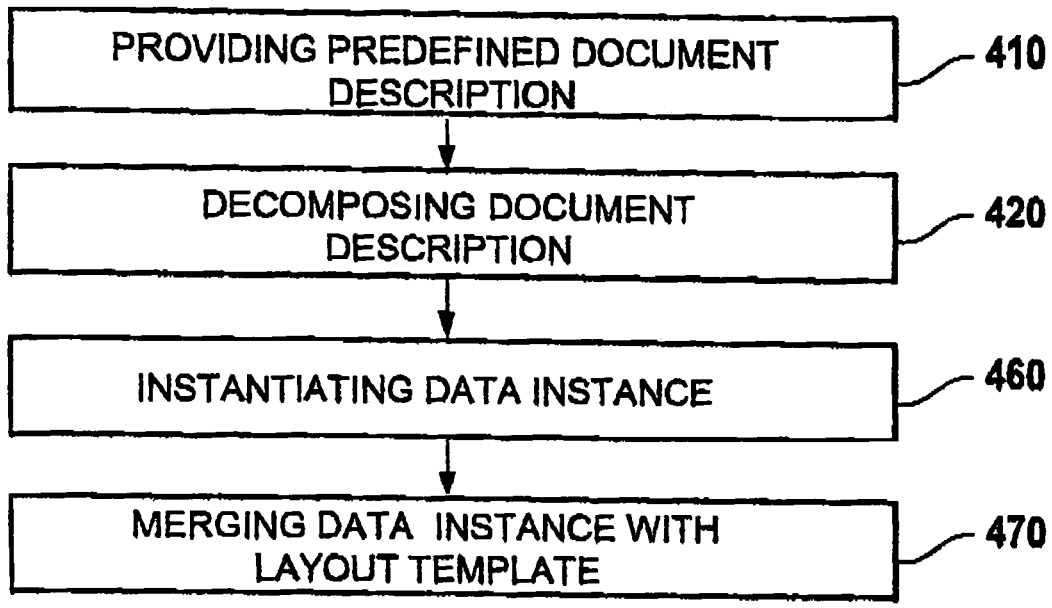
FIG. 2 illustrates a flow chart of an exemplary implementation of the inventive method for separating and processing layout information and data.

FIG. 2 illustrates a flow chart of an exemplary implementation of the inventive computer-implemented method 400 for separating and processing layout information and data.

Figure 4:
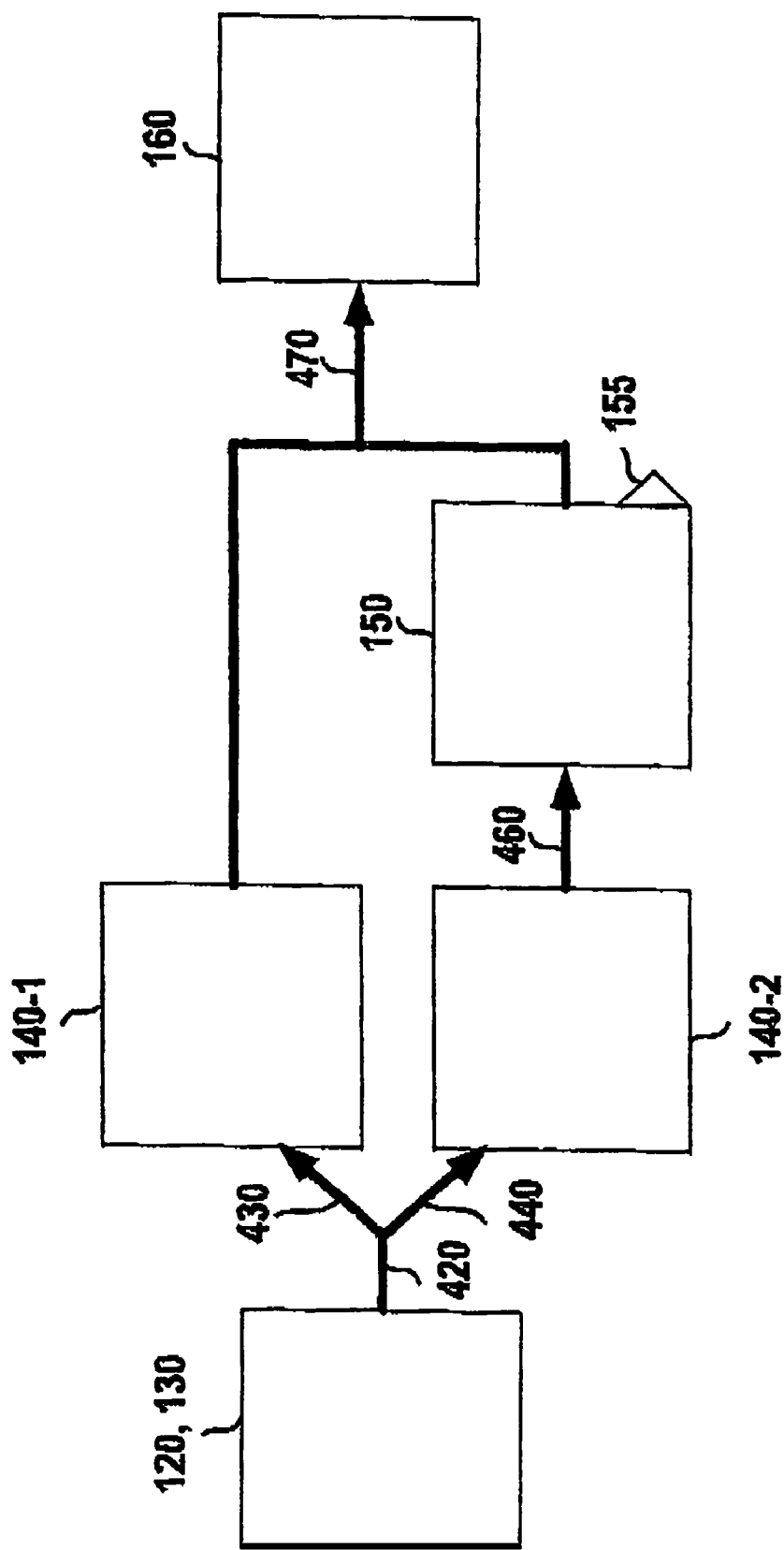
FIG. 4 illustrates processing of documents and data according to an exemplary implementation of the present invention.
Figure 5:
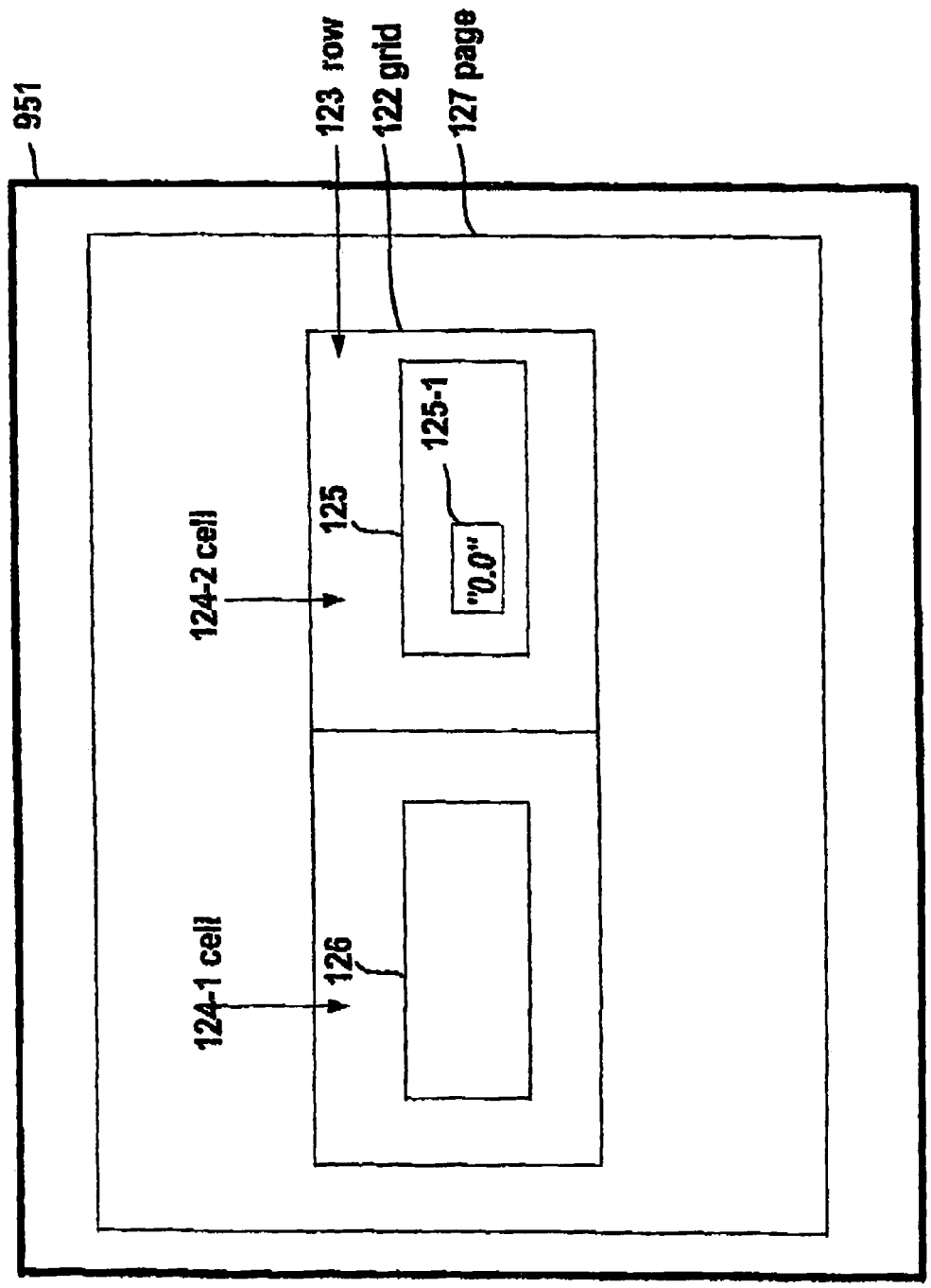
FIG. 5 illustrates a visual representation of an individual document description.

The example for document 120, 130 of FIG. 4 that is used throughout the detailed description is a survey application example as illustrated in FIG. 5. The controller of a company wants to capture financial planning data for the fiscal year 2002 from other managers in the company. For this reason, the controller creates a survey questionnaire, comprising various layout elements, such as page 127, grid 122, TextOutput 126, FieldInput 125, etc. (cf. FIG. 5). Layout element TextOutput 126 includes the text "Planned travel costs 2002." Managers prompted with this text input their planned travel cost data into layout element FieldInput 125. Hence, the resulting survey document comprises both layout information and data.

All tables with program coding sections that are used in the description are exemplary and explanatory only and not intended to provide a fully functional computer program.

Method 400 comprises the steps of:

a) providing 410 predefined document description 120, 130; and b) decomposing 420 document description 120, 130 into layout template 140-1 and data description 140-2.

Method 400 may optionally comprise additional steps c) and d) of:

c) instantiating 460 data instance 150 from data description 140-2; and d) merging 470 data instance 150 with layout template 140-1 into individual document description 160.

The steps are now described in detail.

In the providing step 410, computer system 999 (cf. FIG. 1) provides predefined document description 120, 130. Preferably, predefined document description 120, 130 is a markup language description document. In the survey example that is used throughout the description of the present invention, the predefined document description is a XML document 120 or a XHTML document 130. Preferably, the XHTML document 130 may be automatically derived from the XML document 120 (or vice versa) by a style sheet language transformation, such as XSLT.

Any markup language, such as XML, serves the purpose of defining layout elements 122, 123, 124-1, 124-2, 125, 126, 127 (cf. FIG. 5) in document description 120. Table 1 corresponds to a XML document that describes human interface 951 (cf. FIG. 1) by using LEs. The prefix "uicl:" in table 4 represents the namespace of the layout elements.

The following line numbers refer to table 1. LE page 127 for the "survey page" is defined in line 2 and closed in line 14. Page 127 comprises further LEs. Line 4 describes the LE Grid 122. Grid 122 in this example has one row and two columns. Grid 122 comprises LE Row 123. Row 123 carries a visible attribute (Line 5). Row 123 comprises cells 124-1, 124-2 (lines 9, 6). Cell 125 has a default attribute 125-1 with the value "0.0". The name attribute (line 10) indicates the data path for the data of cell 125. In the example, the data path is "/survey/planned_costs/travel." Hence, data and layout information are mixed in document description 120. Lines 8 and 11-14 are closing commands of the corresponding LE.

Preferably, the data path may use XML Path Language (XPath) notification, known in the art. XPath is a language that describes a way to locate and process items in XML documents by using an addressing syntax based on a path through the document's logical structure or hierarchy. The XPath language is described in the "XPath W3C Recommendation Version 1.0, Nov. 16, 1999." XPath also allows the application programmer to deal with the document at a higher level of abstraction. XPath is a language that is used by and specified as part of both, XSLT and XPointer (SML Pointer Language). It uses the information abstraction defined in the XML Information Set (Infoset). Since XPath does not use XML syntax itself, it could be used in contexts other than those of XML.

TABLE 1 document description 120 in the survey example

| Line | Code |
|---|---|
| 1 | <?xml version="1.0" encoding="utf-8"?> |
| 2 | <uicl:page id="survey" xmlns:uicl="http://www.sap.com/sapble/page"> |
| 2 | <uicl:page id="survey"> |
| 3 | ... |
| 4 | <uicl:Grid rows="1" cols="2" id="planned_costs"> |
| 5 |   <uicl:Row visible="{boolean(//survey/planned_costs/travel)}"> |
| 6 |     <uicl:Cell> |
| 7 |       <uicl:TextOutput text="Planned travel costs 2002 :"/> |
| 8 |     </uicl:Cell> |
| 9 |     <uicl:Cell> |
| 10 |       <uicl:FieldInput default="0.0" name="//survey/planned_costs/travel"/> |
| 11 |     </uicl:Cell> |
| 12 |   </uicl:Row> |
| 13 | </uicl:Grid> |
| 14 | </uicl:page> |

Preferably, document description 120 may be automatically converted into document description 130 (or vice versa) via a style sheet language transformation, such as XSLT by using appropriate conversion rules, known in the art.

Table 2 illustrates, by way of a non-limiting example, a XHTML document example of document description 130 in the survey example that describes the same human interface 951 (cf. FIG. 5) as document description 120. The standard HTML instructions are not explained in detail, as they are known to any person of skill in the art. The following line numbers refer to table 2. In the case of automated conversion LE page 127 (cf. FIG. 5) is converted into lines 1-6 and 22-24, where line 6 defines an interaction method for the page 127.

LE grid 122 is converted into the table instructions of lines 9, 20 having one row 123 (lines 10, 19). Cell 124-1 conversion results in lines 11-13 and cell 124-2 conversion in lines 14-18. The text between the "span" tags in line 12 results from LE 126 (cf. table 1, line 7). The name attribute of the input field instruction (line 16) corresponds to the data path of data of the input field instruction. The input field instruction carries the further attributes "type" and "value." The text attribute results from FieldInput LE 125 (cf. table 1, line 10) and the value attribute from its default value "0.0,"

TABLE 2 document description 130 in the survey example

| Line | Code |
|---|---|
| 1 | <html xmlns="http://www.w3.org/TR/xhtml1"> |
| 2 |  <head> |
| 3 |   ... |
| 4 |  </head> |
| 5 |  <body> |
| 6 |   <form method="post" name="survey"> |
| 7 |    ... |
| 8 |    ... |
| 9 |    <table> |
| 10 |     <tr> |
| 11 |      <td> |
| 12 |       <span>Planned travel costs 2002 :</span> |
| 13 |      </td> |
| 14 |      <td> |
| 15 |       <span> |
| 16 |        <input name="//survey/planned_costs/travel" type="text" value="0.0"/> |

TABLE 2-continued document description 130 in the survey example

| Line | Code |
|---|---|
| 17 |       </span> |
| 18 |      </td> |
| 19 |     </tr> |
| 20 |    </table> |
| 21 |    ... |
| 22 |   </form> |
| 23 |  </body> |
| 24 | </html> |

Automated conversion is not required to provide document description 130. Computer system 999 can retrieve predefined document description 130, for example, from memory 920.

In the decomposing step 420, computer system 999 may extract human interface layout template 140-1 and data description 140-2 (cf. FIG. 3) from document description 120, 130. As discussed earlier, for some applications, such as a survey or a service request, a data description does not exist at the point in time, when the human interface 951 (cf. FIG. 5) for the application is described in document description 120, 130. Therefore, for some applications, document description 120, 130 may comprise a mix of layout information and data description. Preferably, during runtime the data may be separately stored from the layout information. This allows a user specific and application specific instantiation and initialization of data without storing redundant layout information with each data instance. Preferably, decomposing step 420 may be performed by applying a style sheet language transformation, such as XSLT, to document description 120, 130. The details of extracting 430 layout template 140-1 and extracting 440 data description 140-2 are explained under FIG. 3.

The further optional steps c) instantiating 460 and d) merging 470 are explained in detail under FIG. 4.

Figure 3:
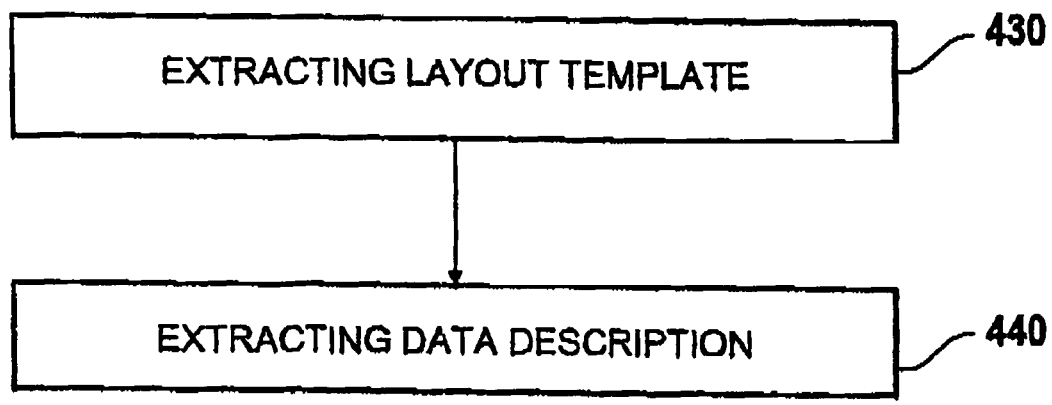
FIG. 3 illustrates details one method step of an exemplary implementation of the present invention.

FIG. 3 illustrates details of method step 420 of an exemplary implementation of the present invention.

In the extracting layout template step 430, computer system 999 may process document description 120, 130, preferably by using a style sheet transformation, such as XSLT, to create layout template 140-1 (cf. table 5). Tables 3 and 4 show two different exemplary implementations for the style sheet language transformation. Table 3 may be used in case XML document description 120 is processed, whereas table 4 may be used when XHTML document description 130 is processed. For other markup language type documents, a person of skill in the art can create corresponding transformation rules.

For convenience of explanation, table 3 comprises an example of a transformation rule for the layout element FieldInput 125 (cf. table 1, line 10; cf. FIG. 5), because FieldInput 125 comprises both layout information and data. Transformation rules for other layout elements can be defined accordingly by any person skilled in the art. The following line numbers without explicit table reference refer to table 3.

TABLE 3 transformation rules for extracting layout template 140-1
from document description 120 in the survey example

| Line | Code |
|---|---|
| 1 | <xsl:transform version="1.0"<br>    xmlns:xsl="http://www.w3.org/1999/XSL/Transform"<br>    xmlns:uicl="http://www.sap.com/sapsurvey/ble"> |
| 2 | ... |
| 3 | <xsl:template match="uicl:FieldInput"> |
| 4 |     <input class="InputField" name="{@name}"<br>        type="text"> |
| 5 |         <xsl:element name="xsl:attribute"> |
| 6 |             <xsl:attribute<br>                name="name">value</xsl:attribute> |
| 7 |             <xsl:element name="xsl:value-of"> |
| 8 |                 <xsl:attribute name="select"><xsl:value-of<br>                    select="@name"/></xsl:attribute> |
| 9 |             </xsl:element> |
| 10 |         </xsl:element> |
| 11 |     </input> |
| 12 | </xsl:template> |
| 13 | ... |
| 14 | </xsl:transform> |

Lines 1, 14 indicate a XSL transformation document. Lines 3, 12 enclose the transformation rule for LE FieldInput 125. Line 4 generates line 11 of target-table 5 when applied to line 10 of source-table 1. Target-table 5 is a preferred, XSLT-based embodiment of layout template 140-1 in the survey example. The data information in the form of the default attribute value "0.0" (cf. source-table 1, line 10) is not generated into layout template 140-1. Layout information is now separated from data. However, a placeholder allows to link to the corresponding data. Lines 5-10 generate the XSL attribute instructions in lines 12, 14 of target-table 5 for the value attribute with the "value-of" instruction (table 5, line 13). The "value-of" instruction points to the location where the value is stored (e.g. data instance 150; cf. FIG. 4) and, therefore, provides the link between the separated layout and data information.

TABLE 4 transformation rules for extracting 430 layout template 140-1
from document description 130 in the survey example

| Line | Code |
|---|---|
| 1 | <?xml version="1.0" encoding="utf-8"?><br><xsl:transform version="1.0"<br>xmlns:xsl="http://www.w3.org/1999/XSL/Transform"> |
| 2 | ... |
| 3 |     <xsl:template match="input"> |
| 4 |         <xsl:copy> |
| 5 |             <xsl:copy-of select="@*[name()<br>                !='value']"/> |
| 6 |             <xsl:element name="xsl:attribute"> |
| 7 |                 <xsl:attribute<br>                    name="name">value</xsl:attribute> |
| 8 |                 <xsl:element name="xsl:value-of"> |
| 9 |                     <xsl:attribute<br>                      name="select">/<xsl:value-of<br>                      select="@name"/></xsl:attribute> |
| 10 |                 </xsl:element> |
| 11 |             </xsl:element> |
| 12 |         </xsl:copy> |
| 13 |     </xsl:template> |
| 14 | ... |
| 15 | </xsl:transform> |

Table 4 comprises transformation rules that may be used to transform document description 130 (cf. table 2) into layout template 104-1 (cf. table 5). For convenience of explanation, table 4 illustrates an example of a transformation rule for the input field instruction (cf. table 5, line 16), because the input field instruction comprises both layout information and data. Transformation rules for other layout elements can be defined accordingly by any person skilled in the art. The following line numbers without explicit table reference refer to table 4.

Line 1 indicates the start of a XSLT document. Lines 3, 13 indicate that the comprised coding applies to the input field instruction in line 16 of table 2. Lines 4, 12 copy the input field instruction of source-table 2 resulting in lines 11, 15 of target-table 5. Line 5 copies all table 2 attributes except value attributes. Therefore, line 11 of target-table 5 has no value attribute. Layout information is now separated from data. However, a placeholder allows to link to the corresponding data. Therefore, lines 6-11 generate XSL instructions for the value attribute into lines 12-14 of target-table 5. Lines 6, 7, 11 generate an attribute instruction for the value attribute (of the input field) in lines 12, 14 of target-table 5. Lines 8-10 generate line 13 of target-table 5 that comprises a "value-of" instruction to retrieve the eliminated data from the corresponding location (e.g. data instance 150; cf. FIG. 4).

TABLE 5 layout template document 140-1 in the survey example

| Line | Code |
|---|---|
| 1 | <?xml version="1.0" encoding="utf-8"?> |
| 2 | <xsl:transform version="1.0" xmlns:xsl=<br>    "http://www.w3.org/1999/XSL/Transform"> |
| 3 | <xsl:template match="/"> |
| 4 | ... |
| 5 | <html> |
| 6 | <form method="post" name="survey"> |
| 7 | <table class="Grid"> |
| 8 |     <xsl:if test="{boolean(//survey/planned_costs/<br>            travel)}"> |
| 9 |         <tr class="row"> |
| 10 |             <td><span class="TextOutput">Planned<br>                travel costs 2002 :</span></td> |
| 11 |             <td><input class="InputField"<br>                name="//survey/planned_cost/<br>                travel"><br>                type="text" |
| 12 |                 <xsl:attribute name="value"> |
| 13 |                     <xsl:value-of select=<br>                      "/env:envelope/env:body/<br>                      survey/planned_costs/travel"/> |
| 14 |                 </xsl:attribute> |
| 15 |             </input></td> |
| 16 |         </tr> |
| 17 |     </xsl:if> |
| 18 | </table> |
| 19 | </form> |
| 20 | </html> |
| 21 | ... |
| 22 | </xsl:template> |
| 23 | </xsl:transform> |

In the extracting data description step 440, computer system 999 may process document description 120, 130, preferably by using a style sheet transformation, such as XSLT, to create data description 140-2. In the survey example, an appropriate XSL transformation may process XML document description 120 in table 1 or XHTML document description 130 in table 2 by scanning the document for name attributes. Each time a name attribute having data path information is detected, corresponding tags for each data path element (<data_path_element>, </data_path_element>) of the data path information may be inserted into data description document 140-2 (cf. table 6). Preferably, data description document 140-2 may be written in a markup language, such as XML. The name attribute "//survey/planned_costs/travel" is detected in line 10 of table 1 and in line 16 of table 2, respectively. The resulting data description 140-2 document in the survey example is shown in table 6. The following line numbers refer to table 6. Line 1 indicates a XML document. Lines 2-4 define the data path "//survey/planned_ costs/travel" of default value "0.0" (line 4). The closing tags </ . . . > (lines 4 to 6) complete the definition of the data path.

TABLE 6 data description document 140-2 in the survey example

| Line | Code |
|---|---|
| 1 | <?xml version="1.0" encoding="utf-8"?> |
| 2 | <survey> |
| 3 |   <planned_costs> |
| 4 |     <travel>0.0</travel> |
| 5 |   </planned_costs> |
| 6 | </survey> |

FIG. 4 illustrates processing of documents and data according to an exemplary implementation of the present invention.

In a preferred embodiment of the present invention, computer system 999 (cf. FIG. 1) may execute the remaining, optional steps of method 400 (cf. FIG. 2) during runtime by:

c) instantiating 460 data instance 150 from data description 140-2; and d) merging 470 data instance 150 with layout template 140-1 into individual document description 160.

In the instantiating step 460, computer system 999 complements data description 140-2 by further, runtime dependent data (data that are created or modified during runtime) resulting in data instance 150. Non-limiting examples of runtime dependent data include user name, document creation date, session ID, error messages, etc. Preferably, data instance 150 may be a markup language document, such as an XML document. The following line numbers refer to table 7. In the survey example, table 7 illustrates an envelope (lines 2, 13) comprising the runtime dependent data user name ("USER1", line 4) in its header (lines 3, 5), whereas the data description (lines 7-11) forms its body (lines 6, 12). The prefix "env:" represents a namespace for the envelope.

TABLE 7 data instance document 150 in the survey example

| Line | Code |
|---|---|
| 1 | <?xml version="1.0" encoding="utf-8"?> |
| 2 | <env:envelope xmlns:env="http://www.sap.com/sapsurvey/env"> |
| 3 |   <env:header> |
| 4 |     <env:user>USER1</env:user> |
| 5 |   </env:header> |
| 6 |   <env:body> |
| 7 |     <survey> |
| 8 |       <planned_costs> |
| 9 |         <travel>0.0</travel> |
| 10 |       </planned_costs> |
| 11 |     </survey> |
| 12 |   </env:body> |
| 13 | </env:envelope> |

If required, data instance 150 may be modified, for example, by an application program (e.g., cf. FIG. 1 computer program 101 on computer 901), prior to applying layout template 140-1. This may be achieved through interface 155. For example, computer system 999 (cf. FIG. 1) may transfer data of data instance 150 (e.g., on computer 900) to the application program through interface 155 and data instance 150 receives modified data from the application program through interface 155. An advantage is an application specific initialization of data instance 150. For example, in the survey example a user (e.g., USER1, cf. table 11, line 4) wants to input the planned travel costs for the fiscal year 2002. The default value that is derived from the corresponding data description 140-2 is "0.0" (cf. table 11, line 9). In the example, the application program knows the real travel cost of the user for the previous fiscal year. The application program is called through interface 155 and runs a query for the previous travel cost. The result value (e.g., "5600.0") is returned to data instance 150 through interface 155 and replaces the old default value "0.0".

In the merging step 470, layout template 140-1 is applied to data instance 150. Preferably, this corresponds to a style sheet transformation of data instance 150.

Table 8 shows individual document description 160 as result of merging step 470. Preferably, document 160 may be written in a markup language, such as XHTML. The following line numbers refer to table 8. Document 160 is similar to the document 130 in table 2. In line 19 of the survey example, layout information (input of type "text") and data from data instance 150 (input value "5600.0") are merged when instruction lines 11-15 of table 5(layout template 140-1) are applied to table 7 (data instance 150). Line 11 of table 5 generates the input field instruction in line 19 with the name attribute "//survey/planned_costs/travel" and the type attribute "text". Lines 12, 14 of table 5 define the value attribute. Line 13 of table 5 comprises an instruction to get the value of the value attribute from a location with the data path "//env:envelope/env:body/survey/planned_costs/travel." When this instruction is applied to data instance 150, the corresponding value (cf. table 7, line 9) is retrieved as the value of the value attribute of the input field instruction.

TABLE 8 individual document description 160 in the survey example

| Line | Code |
|---|---|
| 1 | <?xml version="1.0" encoding="utf-8"?> <html xmlns="http://www.w3.org/TR/xhtml1"> |
| 2 |   <head> |
| 3 |     ... |
| 4 |     ... |
| 5 |     ... |
| 6 |   </head> |
| 7 |   <body> |
| 8 |     <form method="post" name="survey"> |
| 9 |       ... |
| 10 |       ... |
| 11 |       ... |
| 12 |       <table> |
| 13 |         <tr> |
| 14 |           <td> |
| 15 |             <span>Planned travel costs 2002 :</span> |
| 16 |           </td> |
| 17 |           <td> |
| 18 |             <span> |
| 19 |               <input name="//survey/planned_costs/travel" type="text" value="5600.0"/> |
| 20 |             </span> |
| 21 |           </td> |
| 22 |         </tr> |
| 23 |       </table> |
| 24 |       ... |
| 25 |     </form> |
| 26 |   </body> |
| 27 | </html> |

FIG. 5 illustrates a visual representation 951 of individual document description 160.

In the survey example, XHTML instructions (cf. table 8) of individual document description 160 correspond to layout elements page 127, grid 122, row 123, cells 124-1, 124-2, TextOutput 126, FieldInput 125 and attribute 125-1. Preferably, individual document description 160 may be rendered by a conventional browser to prompt a user with visual representation 951 (human interface) for data input into FieldInput 125 on output device 950 (cf. FIG. 1).

Having described the present invention as computer-implemented method 400 the invention is now described as computer system 999.

An exemplary implementation of the inventive computer system 999 (cf. FIG. 1) separates and processes layout information and data of a document.

It may be assumed that computer 900 (cf. FIG. 1) is the operating computer. A person of skill in the art can implement the invention also in a client-server system, where a server computer (e.g. computer 901, cf. FIG. 1) is used for data processing and a client computer (e.g. computer 900, cf. FIG. 1) serves as a front-end computer for the user.

A preferred embodiment of computer system 999 comprises the following means:

a) means for providing 410 (cf. FIG. 2) predefined document description 120, 130 (cf. FIG. 4); and b) means for decomposing 420 document description 120, 130 into layout template 140-1 (cf. FIG. 4) and data description 140-2 (cf. FIG. 4).

Preferably, means a) comprises a markup language document, such as XML document description 120 (cf. table 1) or XHTML document description 130 (cf. table 2). Document description 120, 130 may be preferably stored in memory 920 (cf. FIG. 1) of computer 900.

Preferably, means b) comprises two style sheet language transformation documents that are applied to document 120, 130 to extract layout template 140-1 and data description 140-2. An example for the style sheet transformation document to extract layout template 140-1 from document description 120 is given in table 3. A further example for the style sheet transformation document to extract layout template 140-1 from document description 130 is given in table 4. Preferably, the style sheet language transformations are stored in memory 920.

The style sheet language transformation document to extract data description 140-2 is described in the detailed description of FIG. 3. Preferably, processor 910 processes the corresponding style sheet language transformation documents and stores the resulting documents 140-1 and 140-2 in memory 920. In this preferred embodiment of computer system 999, a design-time memory portion of memory 920 may be used because the decomposing step 450 occurs during design-time of human interface 951 (cf. FIG. 5). Optionally, a runtime memory portion of memory 920 can be used.

Optionally, computer system 999 further comprises:

c) means for instantiating 460 (cf. FIG. 2) data instance 150 (cf. FIG. 7) from data description 140-2; and d) means for merging 470 (cf. FIG. 2) data instance 150 with human interface layout template 140-1 into individual document description 160 (cf. FIG. 7

Preferably, means c) comprises a computer program that reads data description 140-2 from memory 920 and creates data instance document 150 in a runtime portion of memory 920 (e.g. a RAM for storing runtime data) by adding runtime dependent data to the data of data description 140-2. Runtime dependent data are created or modified, e.g. by an application program (e.g. 101 on computer 901, cf. FIG. 1 description), during runtime. Table 7 shows a markup language document example of data instance 150.

Preferably, means d) comprises layout template 140-1. Processor 910 reads layout template 140-1 from memory 920 and applies it to data instance 150. The result is individual document description 160 (cf. XHTML example in table 8), which is a markup language document that is stored in a runtime portion of memory 920 and can be rendered by a conventional browser on output device 950.

Having described the present invention as computer implemented method 400 and computer system 999, it is now described as a computer program product 100 (cf. FIG. 1) that can be stored on a computer readable data carrier 970 (cf. FIG. 1).

Computer program product 100 may have a plurality of instructions for causing a processor (e.g., processor 910) of a computer (e.g., computer 900) to create and process a human interface description. In a preferred embodiment, computer program product 100 may cause computer 900 to execute the following steps:

a) providing 410 predefined document description 120, 130; and b) decomposing 420 document description 120, 130 into layout template 140-1 and data description 140-2.

Computer program 100 steps a) and b) are equivalent to method 400 steps a) and b), respectively (described in detail under FIGS. 2 and 3).

In the preferred embodiment, computer program product 100 may cause computer 900 to execute the further, optional steps c) and d) of:

c) instantiating 460 data instance 150 from data description 140-2; and d) merging 470 data instance 150 with layout template 140-1 into individual document description 160.

Computer program 100 steps a) to d) are equivalent to method 400 steps a) to d), respectively (described in detail under FIGS. 2, 3 and 4).

Computer program product 100 can be stored on a computer readable data carrier (e.g. data carrier 970).

| Reference | Description |
|---|---|
| 100, 101, 102 | Computer program products |
| 122, 123, 124-1, 124-2, 125, 126, 127 | Layout elements |
| 120, 130 | document descriptions |
| 140-1 | Layout template |
| 140-2 | Data description |
| 150 | Data instance |
| 155 | Application interface |
| 160 | Individual document description |
| 400 | Method |
| 4xx | Method steps |
| 999 | Computer network system |
| 900, 901, 902 | Computers |
| 910, 911, 912 | Processors |
| 920, 921, 922 | Memories |
| 930 | Bus |
| 940 | Input device |
| 950 | Output device |
| 951 | Cursor |
| 960 | User interface |
| 970 | Program carrier (computer readable device) |
| 980 | Program signal |

Reference number table

The invention claimed is:

1. A computer-implemented method for separating and processing layout information and data of a document, wherein the document describes an interface to an application, the method comprising the steps of:

receiving a predefined document description with an attribute, the attribute comprising a default attribute value and a data path having a plurality of elements;

decomposing the document description into a layout template and a data description by extracting the layout template and the data description from the document description using a style sheet language transformation, the layout template containing a placeholder linking to corresponding data, and the data description containing the default attribute value and a plurality of tags corresponding to the data path elements, the decomposing further comprising:
   detecting the attribute in the document description;
   inserting, for data path elements of the attribute, corresponding tags in the data description, wherein the tags are arranged hierarchically in the data description; and
   inserting the default attribute value in the data description at a lowest hierarchical level of the tags; and
storing the layout template and the data description in different locations.

2. The method of claim 1, further comprising
instantiating a data instance from the data description using run-time data;
receiving an input from the application and modifying the default attribute value with the received input;
merging the data instance with the layout template to create an individual document description; and
rendering the individual document description and presenting the individual document description to the user.

3. The method of claim 2, wherein the merging step uses a transformation program in a programming language.

4. The method of claim 3, wherein the transformation program is a style sheet language transformation.

5. The method of claim 2, the decomposing further comprising:
   inserting a reference to the attribute in the layout template; and
   inserting a link, in the layout template, to the modified attribute value in the data instance.

6. A data storage medium readable by a computer, the data storage medium storing a plurality of instructions for causing a processor of the computer to separate and process layout information and data of a document, the plurality of instructions causing the computer to execute the method according to claim 1.

7. A computer system for separating and processing layout information and data of a document, wherein the document describes an interface to an application, the computer system comprising:
   a receiving component receiving a predefined document description with an attribute, the attribute comprising a default attribute value and a data path having a plurality of elements;
   a decomposing component decomposing the document description into a layout template and a data description by extracting the layout template and the data description from the document description using a style sheet language transformation, the layout template containing a placeholder linking to corresponding data, and the data description containing the default attribute value and a plurality of tags corresponding to the data path elements, the decomposing component further performing:
      detecting the attribute in the document description;
      inserting, for data path elements of the attribute, corresponding tags in the data description, wherein the tags are arranged hierarchically in the data description; and
      inserting the default attribute value in the data description at a lowest hierarchical level of the tags; and
   a storage component storing the layout template and the data description in different locations.

8. The computer system of claim 7, further comprising:
   an instantiating component instantiating a data instance from the data description using run-time data;
   an interface component receiving an input from the application and modifying the default attribute value with the received input;
   a merging component merging the data instance with the layout template to create an individual document description; and
   a rendering component rendering the individual document description and presenting the individual document description to the user.

9. The computer system of claim 8, the means for decomposing further comprising:
   inserting a reference to the attribute in the layout template; and
   inserting a link, in the layout template, to the modified attribute value in the data instance.

10. A computer program product, tangibly embodied in a computer-readable storage medium, having a plurality of instructions for causing a processor of a computer to separate and process layout information and data of a document, wherein the document describes an interface to an application, the computer program product causing the computer to execute the following steps:
   providing a predefined document description with an attribute, the attribute comprising a default attribute value and a data path having a plurality of elements;
   decomposing the document description into a layout template and a data description by extracting the layout template and the data description from the document description using a style sheet language transformation, the layout template containing a placeholder linking to corresponding data, and the data description containing the default attribute value and a plurality of tags corresponding to the data path elements, the decomposing further comprising:
      detecting the attribute in the document description;
      inserting, for data path elements of the attribute, corresponding tags in the data description, wherein the tags are arranged hierarchically in the data description; and
      inserting the default attribute value in the data description at a lowest hierarchical level of the tags; and
   storing the layout template and the data description in different locations.

11. The computer program product of claim 10, causing the computer to further execute the steps of:
   instantiating a data instance from the data description using run-time data;
   receiving an input from the application and modifying the default attribute value with the received input;
   merging the data instance with the layout template to create an individual document description; and
   rendering the individual document description and presenting the individual document description to the user.

12. The computer program product of claim 11, the decomposing further comprising:
   inserting a reference to the attribute in the layout template; and
   inserting a link, in the layout template, to the modified attribute value in the data instance.

* * * * *